Figure 1:
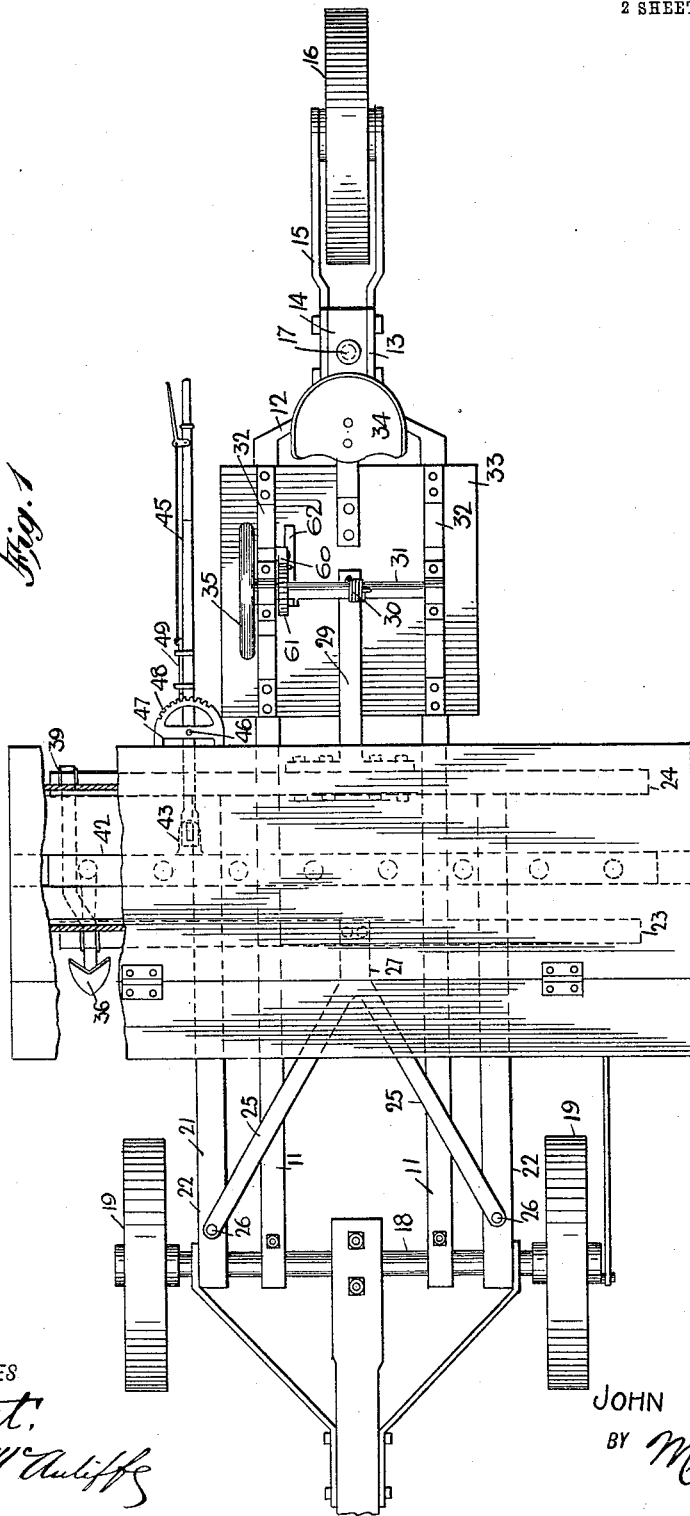

J. S. DUNGAN.
FERTILIZER DISTRIBUTER.
APPLICATION FILED DEC. 18, 1912.

1,069,398.

Patented Aug. 5, 1913.
2 SHEETS—SHEET 1.

WITNESSES
F. D. Swert
J. L. McAuliffe

INVENTOR
JOHN S. DUNGAN,
BY
ATTORNEYS

J. S. DUNGAN.
FERTILIZER DISTRIBUTER.
APPLICATION FILED DEC. 18, 1912.
1,069,398.
Patented Aug. 5, 1913.
2 SHEETS—SHEET 2.
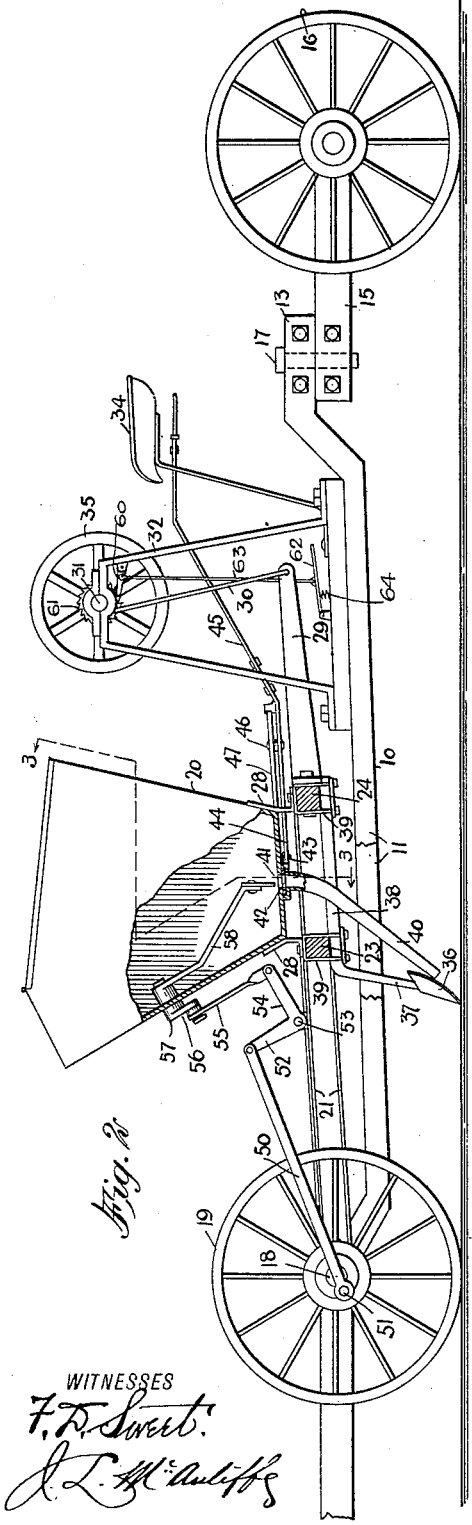
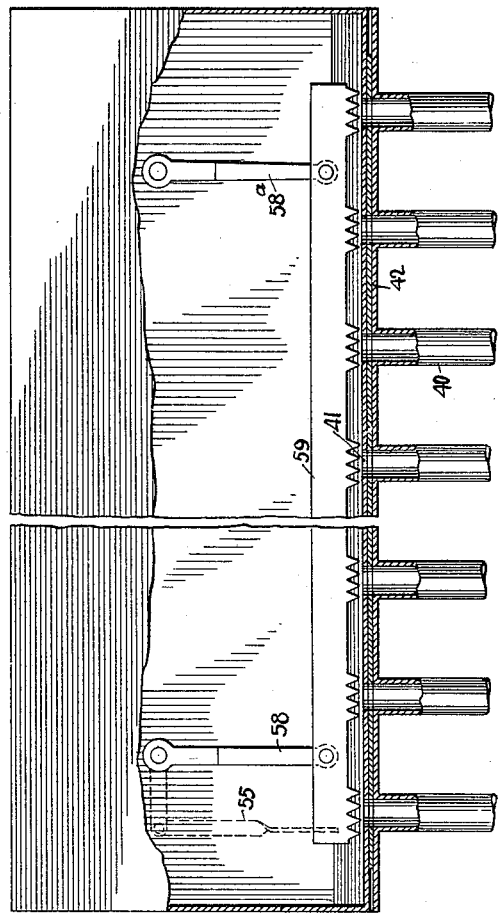
WITNESSES
INVENTOR
JOHN S. DUNGAN,
BY
ATTORNEYS

UNITED STATES PATENT OFFICE.

JOHN SMITH DUNGAN, OF LEMONCOVE, CALIFORNIA.

FERTILIZER-DISTRIBUTER.

1,069,398.

Specification of Letters Patent.   Patented Aug. 5, 1913.

Application filed December 18, 1912.   Serial No. 737,405.

*To all whom it may concern:*

Be it known that I, JOHN S. DUNGAN, a citizen of the United States, and a resident of Lemoncove, in the county of Tulare and State of California, have invented a new and Improved Fertilizer-Distributer, of which the following is a full, clear, and exact description.

My invention is more particularly intended for embodiment in a fertilizer distributer especially adapted for orchard use.

An object of the invention is to construct an implement of the indicated character having improved adjusting means whereby to run the implement to any desired depth.

A further object of the invention is to form an implement of strong and durable construction, in which provision is made for adjusting the depth and for effectively discharging and distributing the fertilizer without any complicated feed mechanism, such as is usually found in implements of the same general character.

The invention will be more particularly explained in the specific description hereinafter to be given.

Reference is to be had to the accompanying drawings forming a part of this specification, in which similar characters of reference indicate corresponding parts in all the views.

Figure 1 is a plan view of a fertilizer distributer embodying my invention, parts being broken away; Fig. 2 is a side elevation with parts broken out, and others in section; and Fig. 3 is a transverse vertical section on a larger scale, through the hopper, the section being taken on approximately the line 3—3 of Fig. 1.

In constructing an implement in accordance with the illustrated embodiment of my invention, a main frame 10 is provided, comprising longitudinal side bars 11 of any desired form and material, said bars being suitably joined at their rear ends. In the example shown, the side bars are brought together, as at 12, at the rear end, and then extend parallel rearwardly as at 13, and receive between them, in the instance shown, a block 14, to which the fork 15 of the single rear wheel 16 is pivoted, as by a pin 17. At the front the longitudinal bars 11 have suitable connection with the axle 18 of a pair of front wheels 19. Thus the main frame extends in rigid form from the front axle to the pin 17 of the rear wheel 16.

I provide a hopper 20 on a rigid auxiliary frame 21, which is disposed above the main frame 10, the front end of the auxiliary frame 21 being pivotally mounted on the front axle 18. The auxiliary frame may be formed of suitable members; in the instance shown the frame comprises longitudinal side bars 22, cross bars 23, 24, and brace arms 25 which are secured at their forward ends to the respective side bars 22, as at 26, and converge at the rear end, being connected by a member 27 with the front cross bar 23. The hopper is shown as supported from the cross bars 23, 24 by brackets 28. To the rear cross bar 24, a rearwardly extending arm 29 is secured, and to the rear end of said arm is connected a rope 30, which runs to a windlass 31. The windlass is shown as mounted in standards 32 on a platform 33 which is rigid with the main frame 10 in the rear of the hopper 20. A seat 34 for the driver is carried by the platform 33 in the rear of the windlass 31, within convenient reach of the hand wheel 35 of the windlass. Thus, by turning the windlass, the arm 29 of the auxiliary frame 21 is rocked vertically relative to the main frame, with the front axle 18 as a center, to raise or lower the auxiliary frame. The auxiliary frame carries shovels 36 rigid therewith, so that the raising and lowering of the auxiliary frame and hopper will raise or lower the shovels 36 and cause the implement to run to a greater or less depth, as may be desired. The shovels will be secured in any suitable manner; I have shown them as provided with shanks or standards 37 that extend rearwardly at their upper ends, as at 38, the rearward extensions being secured to the cross bars 23, 24, by shackles or clips 39.

From the bottom of the hopper and communicating therewith, extend dropper tubes 40, in any suitable number, and in order to discharge the fertilizing material from the hopper through the tubes and regulate the discharge, I provide a novel arrangement of controlling and agitating means, the construction and operation of which in no way interfere with the adjustment of the auxiliary frame to regulate the depth. The hopper bottom is provided with outlet holes 41, leading to the dropper tubes 40, and a regulating plate 42 is arranged beneath the bottom of the hopper to slide longitudinally of said hopper, that is to say, transversely of the machine, the said plate having holes corresponding with the holes 41 in the hopper bottom, and adapted to be brought into and out of registry with said holes by the sliding of the plate. I have shown a rearwardly extending arm 43 on the plate 42, to which is connected the forward end 44 of a lever 45, which may be of any approved construction, the lever being shown as pivoted at 46 on a sector 47, the sector having teeth 48, which engage the usual latch 49. The arrangement is such that on releasing the latch 49, the lever 45 may be rocked to move the slide 42 to bring the holes thereof into and out of register with the holes in the hopper bottom and with the dropper tubes.

For the operation of the implement it is necessary that an agitator be provided in the hopper and I have provided an artical rangement of devices for the purpose which will not interfere with the raising or lowering of the hopper and the rigid auxiliary frame 21. Thus the connecting rod 50 extends from a wrist pin 51 on the front axle 18 to one arm of a bell crank lever 52 fulcrumed as at 53 on the auxiliary frame 21, the other arm 54 of the bell crank lever being pivoted to one end of a link 55, the upper end of which is attached to a crank arm 56 on a rock shaft 57 suitably mounted in the front wall of the hopper 20. Within the hopper the rock shaft 57 carries a crank arm 58, and a second rock arm 58ᵃ is pivoted to the hopper 20. At their lower ends an agitator blade 59 is pivoted to arms 58, 58ᵃ, and ranges lengthwise of the hopper. Thus the rotation of the axle 18 will cause the agitator blade 59 to have a motion above the outlet holes 41, to agitate and discharge the fertilizer.

By running the main frame 10 from the front axle beneath the hopper and auxiliary frame to a connection with the rear wheel 15, and mounting the windlass on the said frame in the rear of the hopper, a rigid construction is obtained of very simple elements, and similarly the auxiliary frame 21 with the hopper and the necessary complement of shovels and dropper tubes, all will be raised and lowered in a convenient manner by the windlass on the main frame. Thus rigidity and simplicity are promoted, together with convenience of manipulation and control. The pivotal connection between the crank arm of the agitator and the bell crank lever 52 through the movement of the link 55, permits the hopper and the auxiliary frame to adjust themselves relatively to the bell crank lever 52 and the connecting rod 50.

For holding the auxiliary frame in the adjusted position a pawl 60 engages ratchet teeth 61 on the windlass 31, the pawl being conveniently operated by a pedal lever 62 connected with the pawl by a connecting rod 63. A spring suitably arranged normally holds the pawl in engagement with the ratchet. In the present instance I have shown a spring 64 beneath the pedal lever 62; thus, normally, by engaging the ratchet, the pawl will hold the auxiliary frame in the adjusted position, and to raise or lower the frame, the pawl is thrown out of engagement by the operator pressing his foot on the pedal lever 62.

The described construction affords a practical means for carrying my invention into effect, and I would state in conclusion that I do not limit myself strictly to the mechanical details herein illustrated, since manifestly the same can be considerably varied without departure from the spirit of the invention.

Having thus described my invention, I claim as new and desire to secure by Letters Patent:—

An agricultural implement, comprising a frame, a revoluble drive element, a seed hopper mounted on the frame to rock vertically with the drive element as a center, an agitator in the hopper mounted to rock transversely of the implement, and operating means for the agitator consisting of a connecting rod extending from the revoluble drive element, a bell crank lever fulcrumed on the frame, and having one arm connected with the said connecting rod, a rock shaft mounted on the hopper, a crank arm on the rock shaft rockable transversely to the implement, a link connecting the crank arm with the other arm of the bell crank lever, and connections between the agitator and the rock shaft, the said connecting rod and bell crank lever accommodating themselves to the vertical movements of the hopper, agitator, crank arm and link.

In testimony whereof I have signed my name to this specification in the presence of two subscribing witnesses.

JOHN SMITH DUNCAN.

Witnesses:
   F. A. McGEE,
   J. A. MOFFETT.

---

Copies of this patent may be obtained for five cents each, by addressing the "Commissioner of Patents, Washington, D. C."